United States Patent [19]

Hurley

[11] Patent Number: 4,562,752
[45] Date of Patent: Jan. 7, 1986

[54] MOTORBIKE APPARATUS

[76] Inventor: Kenneth D. Hurley, 1384 S. Airport, Saginaw, Mich. 48601

[21] Appl. No.: 414,480

[22] Filed: Sep. 2, 1982

[51] Int. Cl.$^4$ .............. F16P 1/00; G05G 25/00; B62D 25/20; B60T 11/26
[52] U.S. Cl. ..................... 74/608; 137/382; 180/90.6; 280/152 R; 60/585; 206/335; 220/85 P
[58] Field of Search ............. 206/527, 335; 220/85 P; 280/152 R; 180/90.6; 137/382, 385; 303/1; 293/112; 74/566, 608

[56] References Cited

U.S. PATENT DOCUMENTS

| | | | |
|---|---|---|---|
| 925,783 | 6/1909 | Miller | 74/608 |
| 2,853,144 | 9/1958 | Mench | 180/90.6 |
| 3,327,804 | 6/1967 | Rike | 180/90.6 |
| 3,980,099 | 9/1976 | Youngblood | 137/385 |
| 4,380,247 | 4/1983 | Douglas | 220/85 P |

Primary Examiner—William T. Dixson, Jr.
Attorney, Agent, or Firm—John J. Swartz

[57] ABSTRACT

A housing for a master brake cylinder having a forwardly projecting piston, including a bottom wall for underlying the piston and at least the forward portion of the cylinder, a pair of upstanding side walls on laterally opposite sides of the bottom wall, and a front wall joined to the bottom wall and spanning the side walls, a top wall joined to the front wall and spanning the side walls, the top wall overlying the piston and being inclined upwardly rearwardly, the top and bottom walls being forwardly convergent.

12 Claims, 4 Drawing Figures

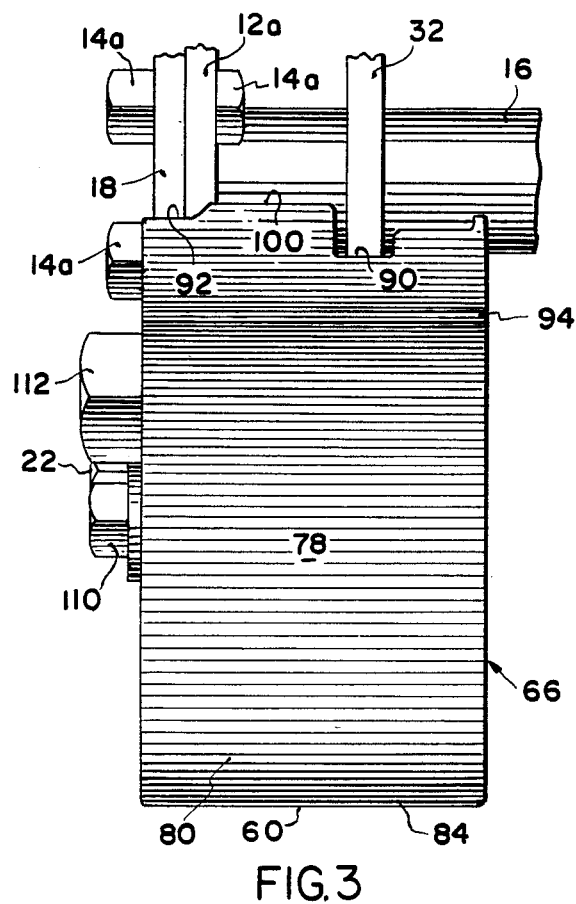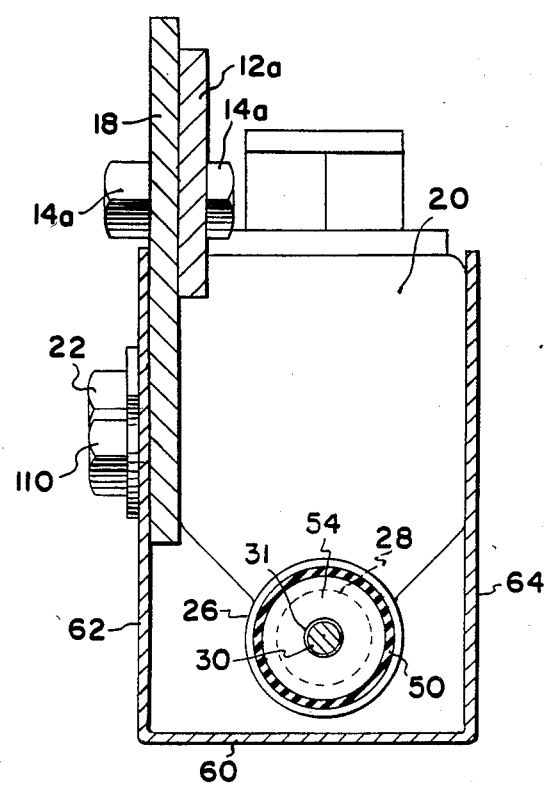

MOTORBIKE APPARATUS

BACKGROUND OF THE INVENTION

1. Field of the Invention

This invention relates to a motorbike and, more particularly, to apparatus for guarding the master brake cylinder of a motorbike to inhibit the passage of foreign material, such as water, dirt and the like, to the cylinder and yet permit access to the cylinder for repair and replacement.

2. Description of the Prior Art

Customized motorbikes conventionally mount the forward controls and brake assembly forwardly of their normal location so as to be juxtaposed behind the front motorbike wheel. The brake assembly includes a brake fluid reservoir which is coupled to a master brake cylinder that mounts a reciprocal piston having a forwardly-projecting piston rod. A pivotally-mounted brake pedal lever is coupled to the piston rod for selectively actuating the brake cylinder to control the motorbike brakes. A hollow, cylindrical bellows shield is conventionally mounted about the piston rod forwardly of the cylinder. When the motorbike travels through surface water, the front wheel propels water upwardly and rearwardly and subjects the brake cylinder to water, which deteriorates the brake cylinder and piston. The master brake cylinder and piston are relatively expensive to replace.

Accordingly, it is an object of the present invention to provide a new and novel housing for protecting or guarding a motorbike master cylinder from foreign matter, such as water, dirt and the like.

Another object of the present invention is to provide a motorbike master cylinder housing including a bottom wall underlying the forward portion of the cylinder and the piston, a pair of upstanding side walls, an upstanding front wall, and a top wall which overlies at least the piston rod and projects rearwardly upwardly to divert the water over the top of the piston rod and cylinder without the necessity of covering the entire cylinder and brake fluid reservoir.

It is yet another object of the present invention to provide a master brake cylinder housing of the type described, wherein the top wall includes a rearwardly opening, open-ended forwardly-projecting slot along the rear portion thereof for receiving a portion of a brake pedal lever in a forward position.

Still another object of the present invention is to provide a brake cylinder housing of the type described, which includes upstanding side walls mounting a top wall terminating forwardly of the rear end of said side walls but includes portions thereof which extend rearwardly of the brake pedal lever in a forward position.

Another object of the present invention is to provide a motorcycle brake assembly housing of the type described, wherein the forward wall includes an upstanding lower portion and an upper forwardly-projecting portion which forwardly converges toward a top wall.

Yet another object of the present invention is to provide a housing of the type described, wherein one of the side walls includes an upwardly-opening, open-ended notch in the upper edge portion thereof, rearwardly adjacent the rearward edge of the top wall.

Yet another object of the present invention is to provide brake apparatus for a motorbike comprising a brake assembly including a master cylinder mounting a forwardly-projecting piston, a brake lever having a lower portion pivotally coupled to the forward portion of the piston, and an upper foot-actuable portion, and mechanism pivotally mounting the lever for swinging movement, such that the foot-actuable portion moves between a rearward inoperative position and a forward brake-actuating position, and a housing for the brake assembly including a pair of upstanding laterally-spaced side walls on laterally opposite sides of the piston and at least a forward portion of the cylinder, a bottom closure wall underlying the piston and the forward portion of the cylinder, spanning the lower edge portions of the side walls, a forward closure wall joined to the bottom wall and spanning the forward edge portions of the side walls, a partial top wall joined to the upper portion of the forward wall and spanning the upper edge portions of the side walls and overlying the piston, the rearward edge portion of the top wall being disposed forwardly of the rear terminal edge portions of the side walls and rearwardly of the foot-actuable foot portion in the forward position.

Another object of the present invention is to provide brake apparatus of the type described, wherein the bottom wall is downwardly rearwardly inclined and the top wall is rearwardly upwardly inclined.

Other objects and advantages of the present invention will become apparent to those of ordinary skill in the art as the description thereof proceeds.

SUMMARY OF THE INVENTION

A housing for a motorbike brake assembly or the like, comprising a pair of laterally spaced-apart upstanding side walls, a bottom closure wall spanning the lower ends of the side walls, a forward end closure wall joined to the bottom wall and spanning the forward ends of the side walls, and a top wall joined to the forward wall and spanning the side walls but terminating forwardly of the rearward ends of the side wall, the forward end wall including a lower upstanding end wall portion and an upper forwardly-projecting portion which forwardly converges and is joined to the top wall.

BRIEF DESCRIPTION OF THE DRAWINGS

These and other objects of the present invention may more readily be understood by reference to the accompanying drawings, in which:

FIG. 3 is a fragmentary, front end view, taken along the line 3—3 of FIG. 1;

FIG. 4 is a front sectional view, taken along the line 4—4 of FIG. 1.

DESCRIPTION OF THE INVENTION

Figure 1:
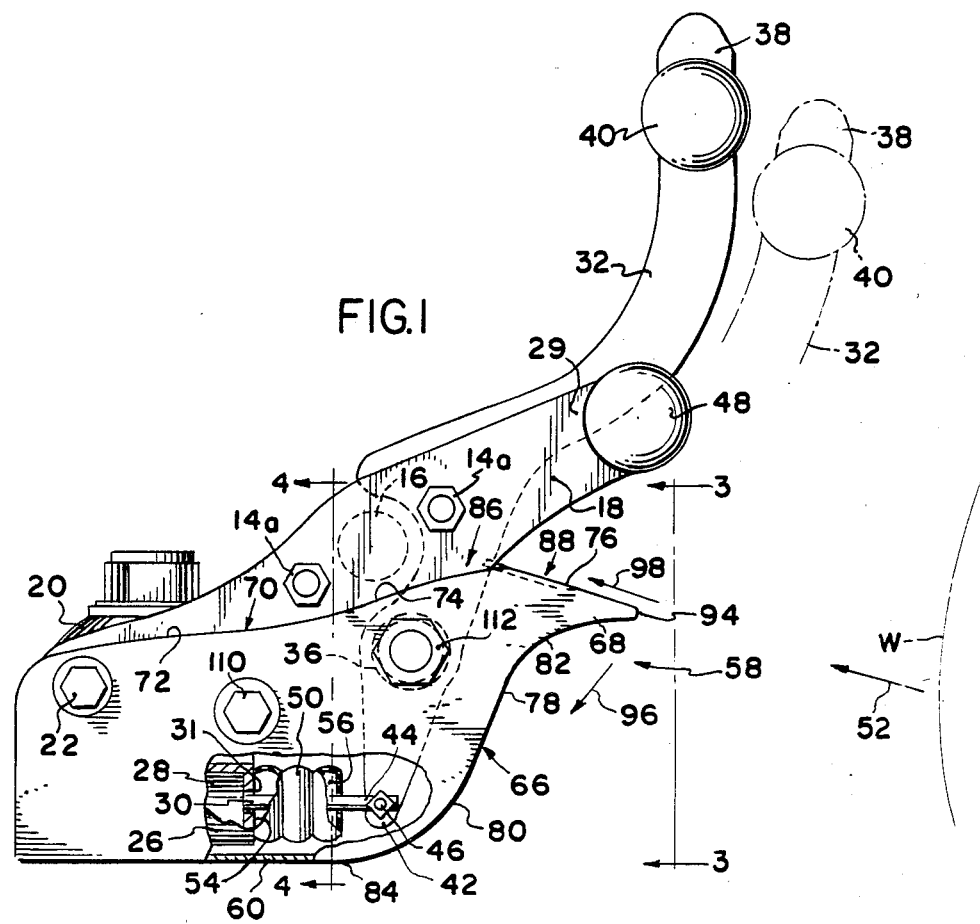
FIG. 1 is a side elevational view of apparatus constructed according to the present invention.

Referring now more particularly to the drawings, the apparatus constructed according to the present invention, generally designated 10, includes a mounting plate 12, coupled to a motorbike frame F via bolts 14. Fixed to the plate 12 is a generally horizontal mounting post 16 having a mounting plate 12a coupled to an enlarged, upwardly forwardly inclined mounting bracket 18 via bolts 14a.

A brake fluid reservoir, generally designated 20, is mounted on the laterally inner side of the rearward end of bracket 18 via bolts 22 and is coupled to the motorbike brakes (not shown) via a brake line 24.

The reservoir 20 is in fluid communication with a master brake cylinder 26 which is mounted on the laterally inner side of the enlarged mounting bracket 18. The master brake cylinder 26 reciprocally mounts a piston 28 having a forwardly projecting piston rod 30 which is slidably received by a forward cylinder wall opening 31.

A brake lever, generally designated 32, is pivotally mounted on a pivot pin 34, fixed to bracket 18, via a sleeve bearing 36. The upper portion 38 of the brake lever 32 mounts a foot pedal 40, whereas the lower portion 42 is pivotally coupled to the forward end 44 of the piston rod 30 via a pivot pin 46. A foot rest 48 is mounted on the laterally outer side 29 of the mounting bracket 18.

The brake lever 32 is pivotally movable between the rearward, inoperative position illustrated in solid lines in FIG. 1 and the forward brake-actuating position illustrated in chain lines in FIG. 1. An expansible and contractable hollow cylindrical bellows 50 is mounted forwardly of the master brake cylinder 26 and encloses the piston rod 30.

The brake apparatus described heretofore is mounted immediately rearwardly of a frame mounted on the front motorbike wheel W and heretofore has been exposed to rearwardly propelled water, schematically designated by the reference character 52. The rearwardly propelled water 52 strikes the forward end 54 of the cylinder with great velocity and sometimes enters the inside 56 of bellows 50 and passes through the cylindrical forward wall opening adjacent the piston rod 30. The bellows 50 do not completely protect the piston rod 30 and passage 31 from the elements, and the water 52 sometimes works its way to the inside 56 of the bellows. When the water enters the inside 56 of the bellows 50, it will collect and sometimes cause rust or other such damage to the outer surface of the piston rod 30, thus inhibiting its free movement. The ingress of water into the cylinder causes damage to the apparatus to prevent the free movement of the piston 28. Also, this problem is exacerbated if the bellows 50 develops a crack or break whereby additional water is permitted to enter the inside 56 of bellows 50.

The housing, generally designated 58, constructed according to the present invention comprises a forwardly upwardly inclined bottom wall 60 underlying the reservoir 20, the master brake cylinder 26, the piston rod 30, and the rearward portion of the brake lever 32. A pair of upstanding, generally parallel side walls 62 and 64 are mounted on laterally opposite sides of the bottom wall 60 and include a generally upstanding lower front wall edge portion 66 and an upper, forwardly projecting, forward upper edge portion 68. The upper edge 70 of the side walls includes a generally linear rear top edge portion 72 and an upwardly forwardly-inclined intermediate top edge wall portion 74 and thence a downwardly forwardly-inclined forward top wall edge portion 76.

The housing 58 includes a front closure wall 78 having a lower, generally upstanding forward wall portion 80 joined to the forward edge 84 of the bottom wall 60, and a forwardly-inclined upper front wall portion 82 which is inclined upwardly forwardly.

The housing 58 includes a top wall, generally designated 86, having a forward portion 88 which is joined to the upper front wall 82 at a leading edge 94 and spans the forward portion 76 of the side walls 62 and 64. The top wall 86 includes an elongate rearwardly opening, open-ended notch 90 for receiving the brake lever 32 in the forward position and a laterally-spaced, rearwardly opening open-ended notch 92 for receiving a forward portion of the outside mounting bracket 18.

As illustrated in the drawing, the top wall 86 extends rearwardly upwardly, and the front wall portion extends rearwardly downwardly such that when water 52 impinges on the leading edge 94, a portion thereof will be diverted downwardly in the direction of the arrows 96, and the upper top wall 86 upwardly deflects a portion of the rearwardly flowing water in the direction of the arrows 98. The upper plate or wall 86 must extend rearwardly to cover the piston rod 30 and thus the trailing edge portion 100 of the top wall 86 is rearward of the brake lever 32 in its forwardmost position, illustrated in chain lines in FIG. 1 so that the water 98 will be propelled completely over the open-top housing opening O rearwardly of the top wall 86. It should be noted that the opening O permits access to the brake fluid reservoir 20 and the master cylinder 26 for repair or the like, but the top wall 86 will direct the water 98 upwardly and over the opening O to inhibit the flow of water to the front of the cylinder 54 and piston rod 30.

The side wall 64 includes an upwardly opening, openended notch 102 rearwardly adjacent the terminal end 100 of the top wall 86 to receive the laterally inner terminal end of bearing 36.

Apertures are provided in the side walls 62 and 64 for receiving bolts 22, 110, and 112 which couple the housing 58 to the outside mounting bracket 18.

The bottom wall 60 is downwardly rearwardly inclined so that any water which inadvertently passes through the opening O will be permitted to free-flow through the rearward open end of the housing 58.

As illustrated in the drawings, the upper front wall portion 82 and top wall 86 converge forwardly to divide the water into two divergent paths, one downwardly in the direction of the arrows 96 and one upwardly in the direction of the arrows 98.

THE OPERATION

Figure 2:
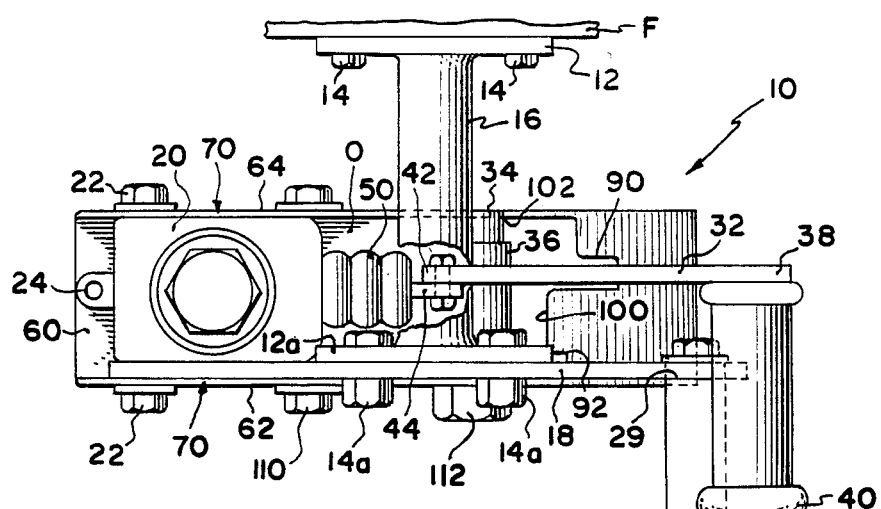
FIG. 2 is a top plan view of the apparatus illustrated in FIG. 1.

The housing 58 is mounted on the motorbike frame as illustrated in FIGS. 1 and 2. As the motorbike proceeds forwardly, water 52 will be propelled rearwardly and will impinge upon the housing 58, whereby a portion of the water 52 will be diverted downwardly via the front closure wall 78 and a portion thereof will be diverted upwardly in the direction of the arrows 98 and will be propelled upwardly over the leading edge 54 of the cylinder 26 as well as the piston rod 30. In the event some of the water, represented by the arrow 98, passes downwardly into the opening O, the water will pass relatively straight downwardly and will not impact the front of the cylinder with the force with which it otherwise would, as substantial amounts of the force of the water will have been dissipated after impinging on the housing 58. In the event water inadvertently enters the inside of the housing 58, the water will merely drain through the open-ended rear portion of the housing 58.

It is to be understood that the drawings and descriptive matters are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A housing for a motorcyle brake assembly or the like, comprising:
   a pair of upstanding laterally spaced apart side walls;
   a bottom closure wall spanning the lower ends of said side walls;
   a forward end closure wall joined to said bottom wall and spanning the forward ends of said side walls; and
   a top wall joined to said forward wall and spanning said side walls but terminating forwardly of the rearward ends of said side walls;
   said forward end wall including a lower upstanding end wall portion and an upper forwardly projection portion which cooperate to define means for diverting foreign matter upwardly and downwardly.

2. The housing set forth in claim 1 wherein said top wall includes a rearward end portion provided with a rearwardly opening, forwardly extending notch therein of a predetermined length.

3. The housing set forth in claim 2 wherein said rearward end portion of said top wall includes a second rearwardly opening notch therein in laterally spaced relation with said first notch, said second notch projecting forwardly a distance less than said first mentioned notch.

4. The housing set forth in claim 1 wherein one of said sidewalls includes an upwardly opening notch in the upper edge portion thereof, rearwardly adjacent the rearward edge of said top wall.

5. The housing set forth in claim 1 wherein said upper forwardly projecting wall portion and said top wall are forwardly convergent.

6. The housing set forth in claim 5 wherein said top wall and said bottom wall are forwardly convergent.

7. The housing set forth in claim 6 wherein one of said side walls includes an upwardly opening notch in the upper edge portion thereof, rearwardly adjacent the rearward edge of said top wall.

8. The housing set forth in claim 7 wherein said rearward end portion of said top wall includes a pair of rearwardly opening, laterally spaced notches therein, one of said notches projecting forwardly of the other of said notches.

9. A housing for a motorbike brake assembly including a brake fluid reservoir, a master brake cylinder mounting a forwardly projecting piston for forward and rearward movement; a brake lever means pivotally mounting said lever for swinging movement between forward and rearward positions, said lever having a lower portion pivotally coupled to the forward portion of said piston and an upper, foot actuable foot pedal portion, and means for communicating brake fluid between said master brake cylinder and said reservoir when said lever is moved between said forward and rearward positions; said housing comprising:
   a pair of laterally spaced, upstanding side walls for extending along opposite sides of said master brake cylinder and said piston;
   a bottom closure wall for underlying said reservoir, said master brake cylinder, and said forwardly projecting piston, spanning the lower ends of said side walls;
   a forward closure wall joined to the forward edge of said bottom wall and spanning the forward edge portions of said side walls;
   a partial top wall joined to the upper edge of said forward wall and spanning said side walls, the rearward edge of said top wall terminating forwardly of the rear edges of said bottom wall and said side walls for overlying at least the forward portion of said piston.

10. The apparatus set forth in claim 9 wherein said forward wall includes a lower upstanding portion and a forwardly projecting upper portion, said top wall and said bottom wall being forwardly convergent; and means for mounting said housing on said motorbike such that said top wall is upwardly rewardly inclined.

11. The apparatus set forth in claim 10 wherein said top wall includes a forwardly projecting, rearwardly opening notch in the rear edge portion thereof for receiving said brake lever in said forward position.

12. The apparatus set forth in claim 11 wherein one of said side walls includes an upwardly opening notch in the upper end thereof, rearwardly of said top wall, for receiving said pivotal mount means.

* * * * *